(12) United States Patent
Yeakley et al.

(10) Patent No.: US 6,195,238 B1
(45) Date of Patent: Feb. 27, 2001

(54) TAPE HEAD AZIMUTH ADJUSTMENT

(75) Inventors: Lester M. Yeakley, Estes Park; Christian A. Todd, Thornton, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/274,788

(22) Filed: Mar. 23, 1999

(51) Int. Cl.[7] .............................. G11B 5/56; G11B 21/24
(52) U.S. Cl. .............................................. 360/291.2
(58) Field of Search ........................... 360/291.2, 291, 360/291.3, 291.1

(56) References Cited

U.S. PATENT DOCUMENTS

| | | |
|---|---|---|
| 4,158,212 | 6/1979 | Dattilo . |
| 4,254,440 | 3/1981 | Martin . |
| 4,268,881 | 5/1981 | Saito . |
| 4,316,226 | 2/1982 | Nakamichi et al. . |
| 4,329,723 | 5/1982 | Schoenmakers . |
| 4,485,420 | 11/1984 | Schoenmakers . |
| 4,550,352 | 10/1985 | Nakao . |
| 4,589,040 | 5/1986 | Kawase . |
| 4,616,280 | 10/1986 | Kobayashi et al. . |
| 4,639,812 | 1/1987 | Nakamichi . |
| 4,686,588 | 8/1987 | Goto et al. . |
| 4,809,108 | 2/1989 | Tanaka et al. . |
| 4,833,558 | 5/1989 | Baheri . |
| 5,043,837 | 8/1991 | Okamura et al. . |
| 5,050,024 | 9/1991 | Nanjyo . |
| 5,146,377 | 9/1992 | Baheri . |
| 5,198,947 | 3/1993 | Nayak et al. . |

FOREIGN PATENT DOCUMENTS

| | | |
|---|---|---|
| 61-222016 | 10/1986 | (JP) . |
| 06-180831 | 9/1994 | (JP) . |

*Primary Examiner*—Craig A. Renner
(74) *Attorney, Agent, or Firm*—Brooks & Kushman P.C.

(57) ABSTRACT

The azimuth angle between a tape head and magnetic tape accessed by the tape head must be properly set in high areal information density magnetic tape drives. A frame for setting the azimuth angle includes a first portion rigidly attached to a base. The head is mounted in a carriage held by a second frame portion permitting the carriage to move in a transverse direction across the tape width. Flexures join the first and second frame portions and permit the second frame portion to be rotated a frame angle relative to the first frame portion. Each flexure is positioned such that, when the frame angle is at a preset value, the flexure is radially aligned with the azimuth axis. A drive is set between the frame first and second portions. The drive rotates the second portion relative to the first portion by deflecting the flexures, thereby changing the azimuth angle.

13 Claims, 5 Drawing Sheets

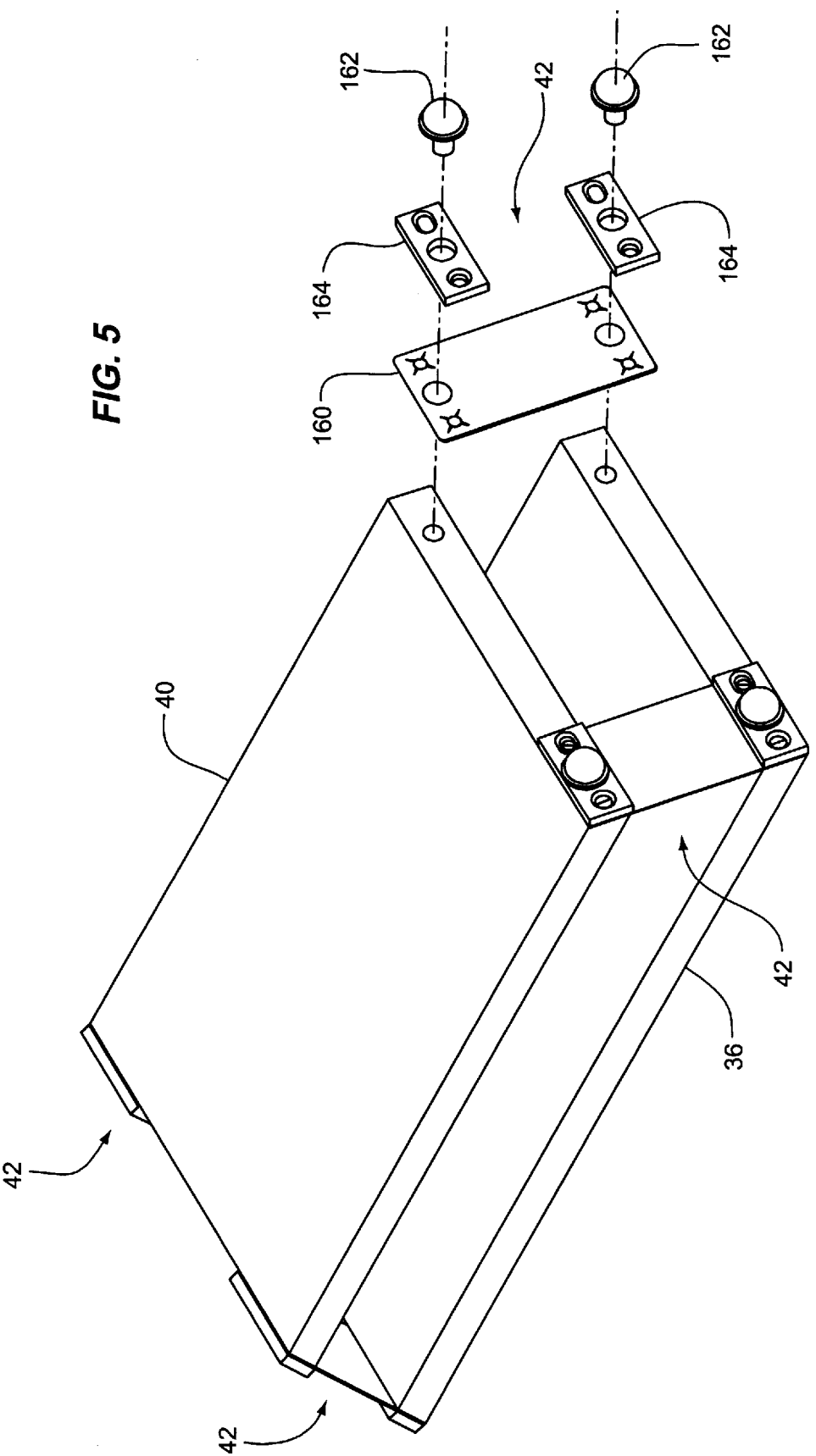

TAPE HEAD AZIMUTH ADJUSTMENT

TECHNICAL FIELD

The present invention relates to mechanisms for adjusting the azimuth angle of a tape head relative to magnetic tape.

BACKGROUND ART

Magnetic tape is commonly used to store voice and data information due to its reliability, cost efficiency, and ease of use. Magnetic tape may be made more useful and cost effective by increasing the aerial density of information stored on the magnetic tape. This has generally been accomplished by including more data tracks on a given width of tape. While allowing more data to be stored, this increase in the number of data tracks requires a narrowing of the width of the data tracks, a narrowing of spacing between the data tracks, or both. As the data tracks are more closely spaced, positioning of the tape with respect to the tape head becomes more critical to reduce the possibility of errors introduced by reading or writing.

Tape heads generally include read elements for reading data from the magnetic tape and write elements for writing data to the magnetic tape. Typically, read elements may be formed in a read module with one read element for each data track that is to be read simultaneously. Similarly, write elements are manufactured into a write module, with one write element for each data track to be written simultaneously. To permit read-after-write operation on tape moving in either tape direction over the tape head, a typical tape head may include a sandwich of one write module between two read modules.

As the areal information density on magnetic tapes increases, the importance of accurately positioning the tape head relative to the magnetic tape also increases. One measure of the relationship between the tape head and the magnetic tape is the azimuth angle. The azimuth angle may be defined as the amount of rotation of the tape head about an axis through the tape and normal to the tape surface. An azimuth angle of zero implies that the tape head is rotationally aligned with the magnetic tape. Several problems may occur if the azimuth angle is too great. First, there may be a loss of read amplitude if the read module is not aligned with data recorded on the magnetic tape. Second, in the case of a multiple element head, data buffer space may overflow due to the time skew between elements. Third, in the case of read-write-read heads implementing read-after-write operations, read elements must track corresponding write elements in order to check for write errors. Fourth, skew between the tape head and the magnetic tape creates relative vertical displacement between a read head in one read module and the corresponding read head in another read module. In order to minimize these effects, and because any tape written on one drive must be capable of being read on another drive, all tape heads must be aligned to a common azimuth standard.

Azimuth adjustment may be further complicated in tape drives that dynamically control the position of the tape head across the width of the magnetic tape. The tape head may be mounted in a carriage which is driven by an actuator to move the tape head across the tape width. Typically, the carriage and actuator are also rotated during azimuth adjustment.

Previous mechanisms permitting azimuth adjustment mount the tape head to one end of an arm with the opposing end fixed. The azimuth is adjusted by bending all or some of the arm about the fixed end. This caused translation of the tape head as well as rotation. Such translation cannot be absorbed within the closee tolerances required in a drive accessing high information density magnetic tape. Further, mechanisms employing an arm may not provide sufficient rigidity to support the carriage and the actuator.

What is needed is an azimuth adjustment mechanism that rotates the tape head about an axis through the center of the tape path. The mechanism should provide sufficient rigidity to support additional components such as the carriage and the actuator while still providing a sufficient range for azimuth adjustment.

DISCLOSURE OF INVENTION

It is an object of the present invention to provide for azimuth adjustment about an axis through the center of the tape path.

Another object of the present invention is to provide for very fine azimuth adjustment.

Still another object of the present invention is to provide for azimuth adjustment that rigidly supports the tape head and head actuator components.

Yet another object of the present invention is to provide for azimuth adjustment over a wide angular range.

In carrying out the above objects and other objects and features of the present invention, a frame is described for setting an azimuth angle of a tape head relative to magnetic tape passing by the tape head. The frame includes a first portion rigidly attached to a base and a second portion holding the carriage. Flexures are connected on a first end to the first portion and on a second end opposite the first end to the second portion. Each flexure is positioned such that, when the frame angle is at a preset value, the first end and the second end are radially aligned with the azimuth axis. The frame angle is the angle between the first portion and the second portion about an axis parallel to the azimuth axis. A drive is set between the first portion and the second portion. The drive rotates the second portion relative to the first portion by deflecting the flexures, thereby changing the azimuth angle.

In an embodiment of the present invention, the first portion defines a first threaded hole and the second portion defines a second threaded hole. The threaded holes share a substantially common centerline tangent to a circle centered on the azimuth axis. The drive includes a differential screw threaded into the first and second threaded holes.

In another embodiment of the present invention, each flexure includes a first thin portion connected to the first frame portion, a second thin portion connected to the second frame portion, and a thick portion connecting the first and second thin portions. In a refinement, each flexure is constructed of a plastically deformable material. At least one thin portion of each flexure deforms as the second frame portion rotates relative to the first frame portion.

In still another embodiment of the present invention, each flexure is formed from a thin plate.

An azimuth adjustment system for changing the azimuth of a tape head relative to magnetic tape traveling over the tape head is also provided. The system includes a carriage for holding the tape head and a base stationary in relation to the tape path. The system also includes a frame having a first portion and a second portion connected to first portion by a plurality of flexures. The first frame portion is rigidly attached to the base. The second frame portion holds the carriage. Each flexure is radially aligned about the azimuth axis when the frame angle is a preset value. The flexures permit rotation of the second frame portion relative to the first frame portion. The system further includes a drive set between the first frame portion and the second frame portion. The drive rotates the second frame portion relative to the first frame portion, thereby changing the azimuth angle.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 5 is a drawing illustrating an alternative flexure embodiment.

BEST MODE FOR CARRYING OUT THE INVENTION

Figure 1:
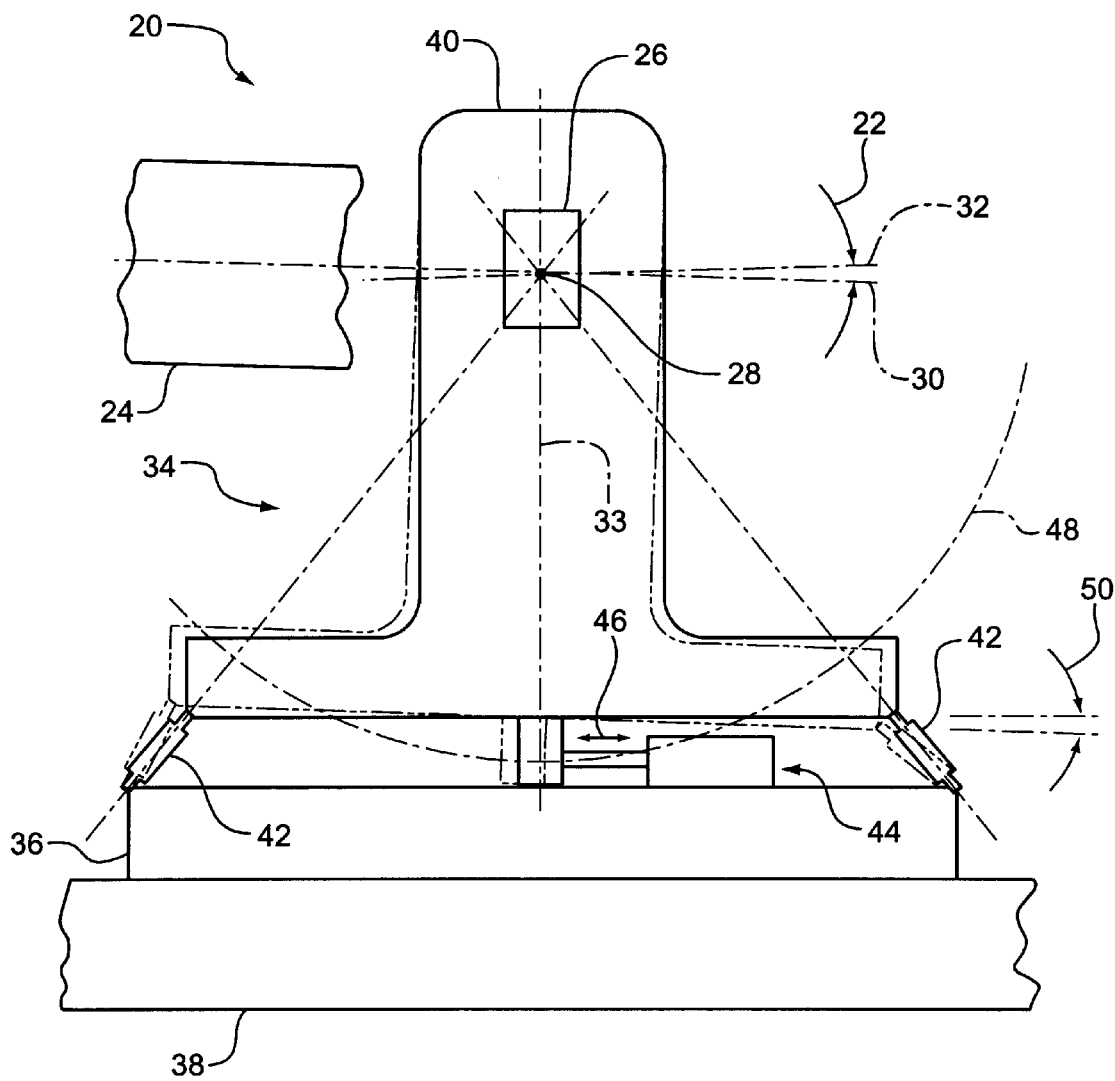
FIG. 1 is a conceptualized drawing illustrating operation of the present invention.

Referring to FIG. 1, a conceptualized drawing illustrating operation of the present invention is shown. A tape access system, shown generally by 20, adjusts azimuth angle 22 between magnetic tape 24 and tape head 26. Azimuth angle 22 may be defined as the rotation of tape head 26 about azimuth axis 28 passing through a tape path defined as tape centerline 30. Similarly, azimuth angle 22 may be defined as the angle between tape centerline 30 parallel to data tracks on tape 24 and head line 32 indicating the optimal path which tape 24 should take over head 26. Head line 32 is normal to transverse line 33. In a preferred embodiment, tape head 26 is moved along transverse line 33 to permit read elements and write elements in tape head 26 access to different sets of data tracks across the width of magnetic tape 24.

System 20 includes a frame, shown generally by 34. Frame 34 includes first portion 36 rigidly attached to base 38. Frame 34 also includes second portion 40 holding head 26 operative to move along transverse line 33. A plurality of flexures 42 join first portion 36 and second portion 40. Flexures 42 permit second portion 40 to move relative to first portion 36. A drive, shown generally by 44, is set between first portion 36 and second portion 40. Drive 44 is preferably a manually turned screw, but may also include linear motors, levers, linkages, and the like powered by electromagnetic, hydraulic, pneumatic, or similar actuators. Drive 44 is operative to produce a force between first portion 36 and second portion 40. The direction of this force, shown by arrows 46, is preferably applied in a direction tangent to circle 48 centered on azimuth axis 28. For small movements of second portion 40 relative to first portion 36, second portion 40 will substantially rotate about azimuth axis 28. For small movements, second portion 40 can be described as having frame angle 50 relative to first portion 36. Flexures 42 are designed such that, for a particular frame angle 50, each flexure 42 is radially aligned with azimuth axis 28. In a preferred embodiment, azimuth axis 28 is normal to both tape centerline 30 and transverse line 33.

FIG. 1 is a conceptualized drawing. Azimuth angle 22 and frame angle 50 are shown larger than expected during normal operation to more clearly indicate the operation of system 20. Further, deformation of flexures 42 is not properly shown due to the slight deformation that would actually occur.

Figure 2:
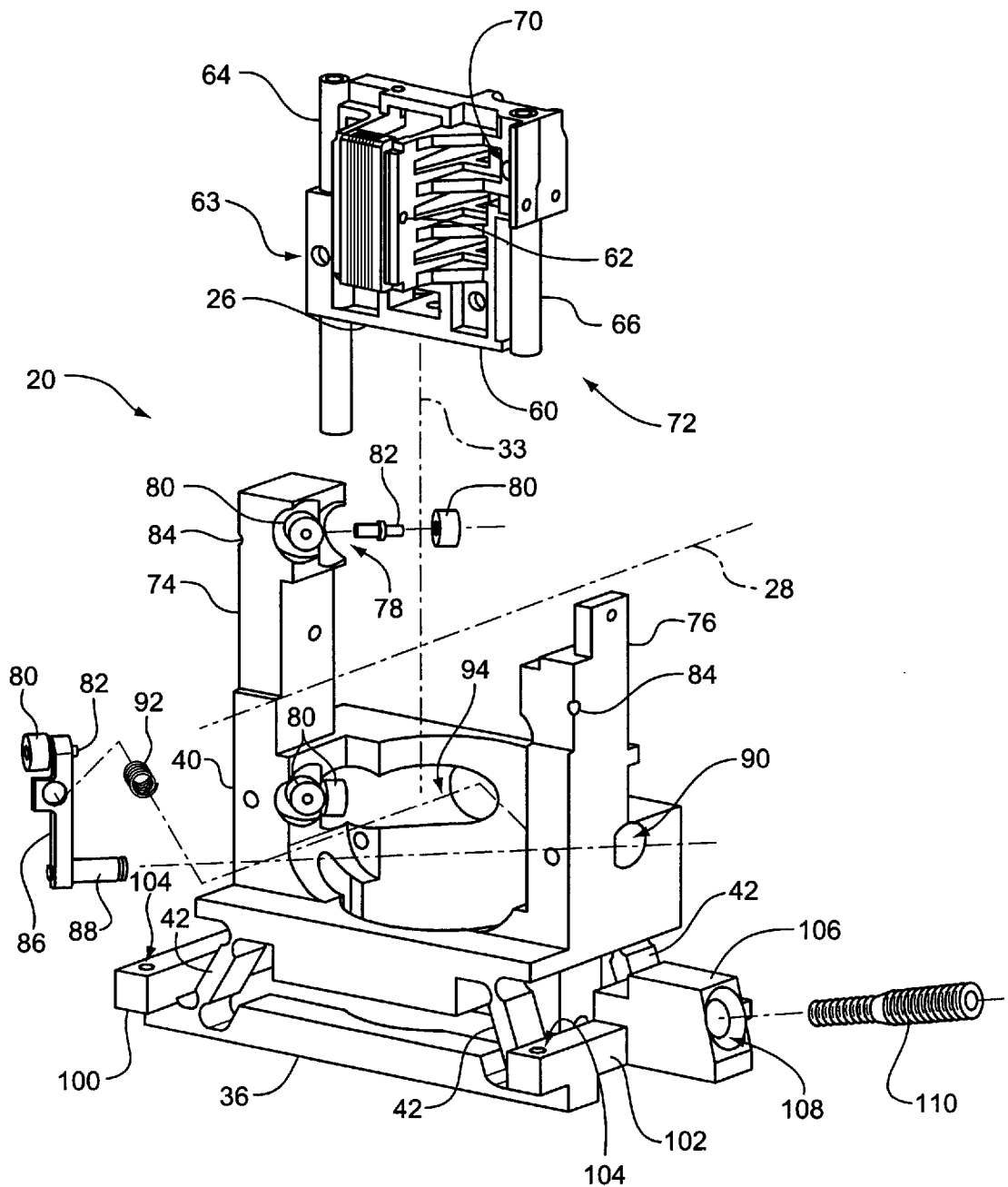
FIG. 2 is an exploded view drawing of an embodiment of the present invention.

Referring now to FIG. 2, an exploded view drawing of an embodiment of the present invention is shown. Head 26 is held in carriage 60 by bonding with an adhesive injected into holes in carriage 60, one of which is shown by 62. First carriage guide rail 64 and second carriage guide rail 66 are bonded into cylindrical openings in carriage 60 with an adhesive injected into hole 63 and hole 70 respectively to form the carriage assembly shown generally by 72.

Second frame portion 40 includes first support 74 and second support 76. First support 74 defines four bearing pockets 78, each bearing pocket 78 holding bearing 80. For each bearing 80, bearing pin 82 passes through bearing hole 84 and into bearing pocket 78 to hold bearing 80 in place. Second support 76 holds two bearings 80. One bearing 80 is fixed to second support 76 in the same manner as bearings 80 to first support 74. The second bearing 80 is held by bearing pin 82 to one end of arm 86. The other end of arm 86 is pivotally mounted to second support 76 by shaft 88 through hole 90. Spring 92 is captured between arm 86 and second support 76. Spring 92 rotates arm 86 so as to load bearing 80 attached to arm 86. When assembled, carriage assembly 72 is captured by bearings 80. Carriage guide rails 64,66 ride on bearings 80 to constrain carriage assembly 72 to one degree of freedom along transverse line 33. Second frame portion 40 defines cavity 94 for receiving a head actuator not shown for clarity.

First frame portion 36 includes first mounting support 100 and second mounting support 102. Mounting supports 100, 102 define mounting holes 104 for rigidly attaching first frame portion 36 to base 38, not shown for clarity. Second mounting support 102 includes fixed drive support 106. Fixed drive support 106 defines large screw hole 108 for accepting differential screw 110. The operation of differential screw 110 in frame 34 is described with regards to FIG. 4 below.

Figure 3:
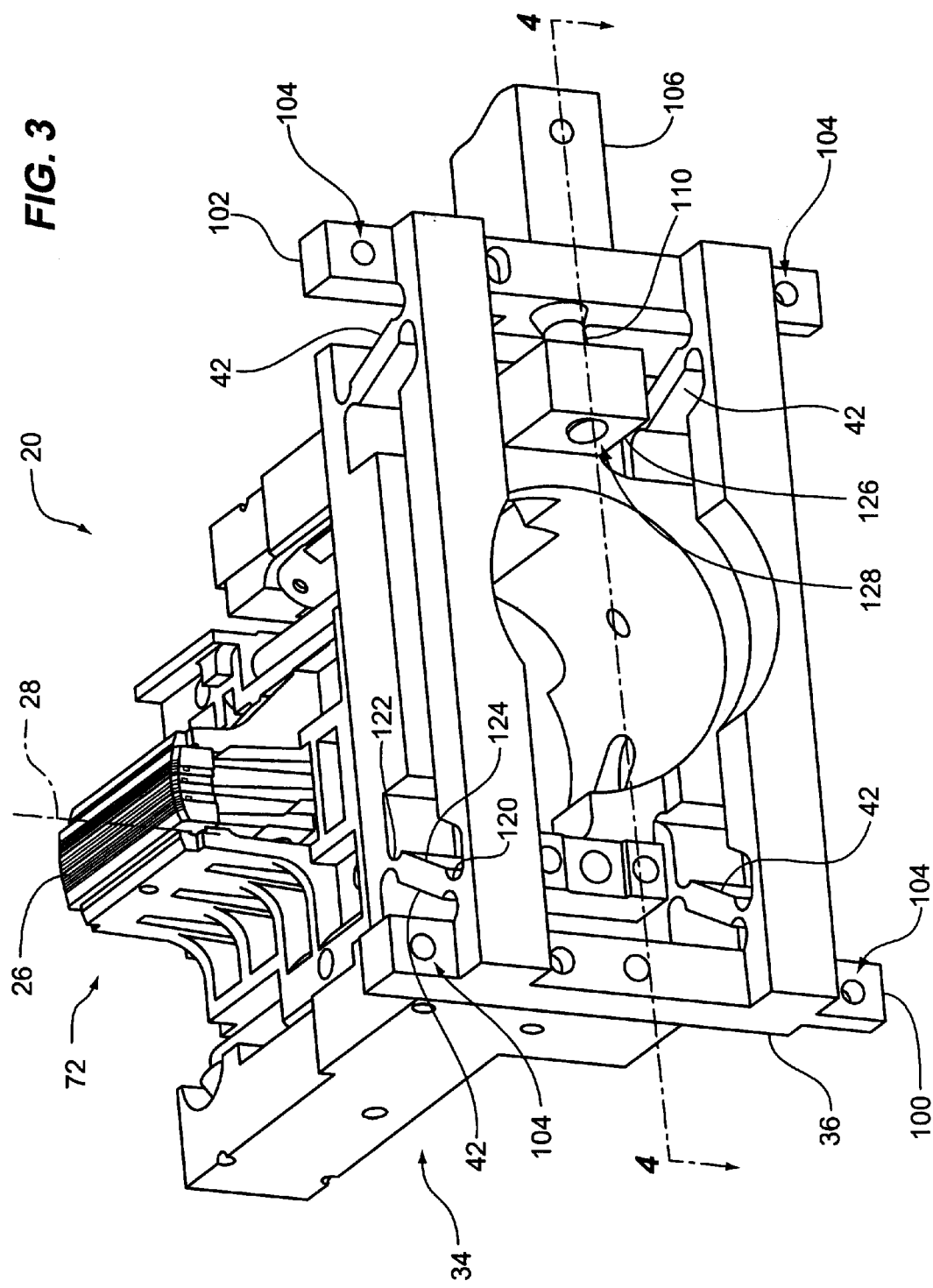
FIG. 3 is a bottom view of an embodiment of the present invention having four flexures.

Referring now to FIG. 3, a bottom view of an embodiment of the present invention having four flexures is shown. Four flexures 42 join first frame portion 36 and second frame portion 40. Each flexure 42 has first thin portion 120 connected to first frame portion 36, second thin portion 122 connected to second frame portion 40, and thick portion 124 connecting first thin portion 120 and second thin portion 122. Thin portions 120,122 deform to permit second frame portion 40 to move relative to first frame portion 36 through an arc segment of circle 48.

One flexure 42 attaches to each lower corner of second frame portion 40. For small movements of second frame portion 40 relative to first frame portion 36, this arrangement of flexures 42 permits second frame portion 40 to substantially rotate about azimuth axis 28. The four flexures 42 provide stiffness to restrict translational motion of second frame portion 40 relative to first frame portion 36 and to restrict rotation of second frame portion 40 relative to first frame portion 36 about any axis normal to azimuth axis 28.

Movable drive support 126 is rigidly attached to second frame portion 40. Movable drive support 126 defines small screw hole 128 for receiving a portion of differential screw 110. The operation of differential screw 110 is described with regards to FIG. 4 below.

Figure 4:
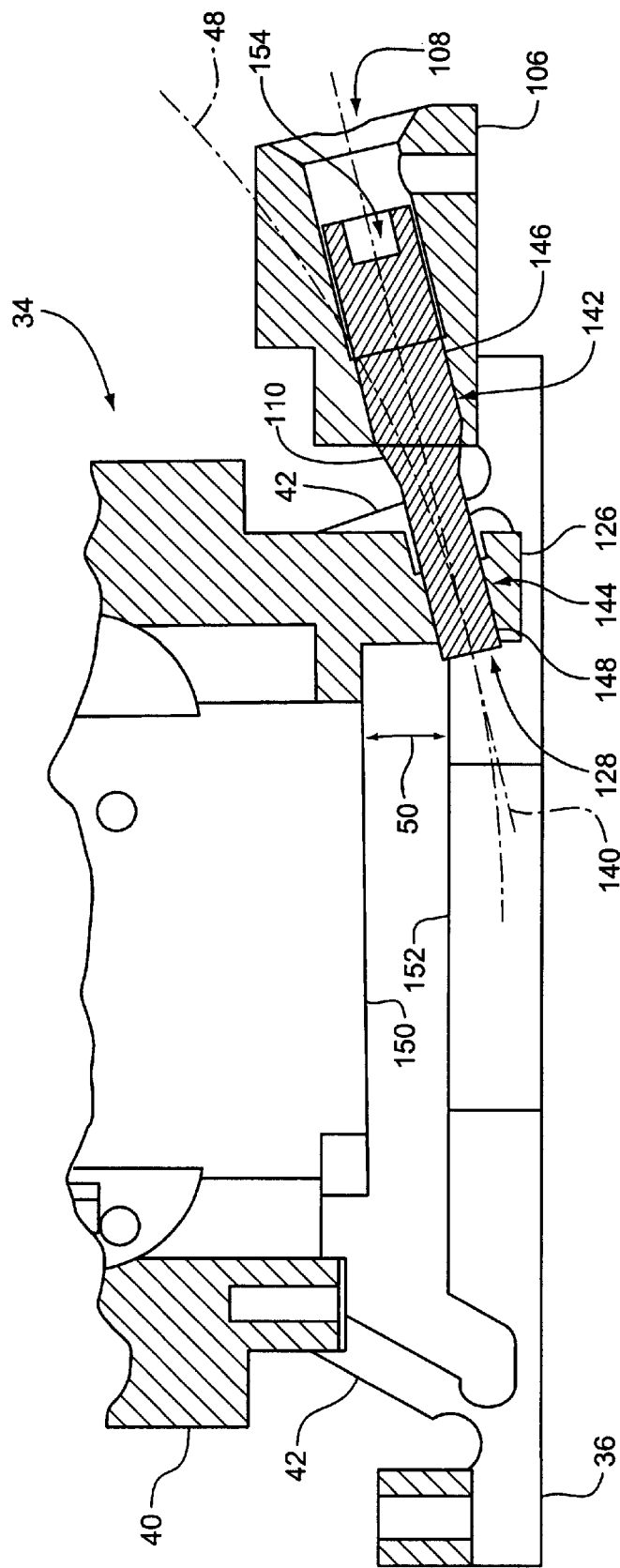
FIG. 4 is a cut view of a portion of a frame according to an embodiment of the invention illustrating a differential screw.

Referring now to FIG. 4, a cut view of a portion of a frame according to an embodiment of the present invention illustrating a differential screw is shown. Large screw hole 108 and small screw hole 128 share a substantially common centerline, indicated by 140. Centerline 140 is tangent to circle 48 centered on azimuth axis 28. A portion of large screw hole 108, indicated by 142, has 10–32 threading. A portion of small screw hole 128, indicated generally by 144, has 6–40 threading. Differential screw 10 has large diameter portion 146 with 10–32 threads and small diameter portion 148 with 6–40 threads. When differential screw 110 is inserted into large screw hole 108, small diameter portion 148 passes through large screw hole 108 and into small screw hole 128. If differential screw 110 is then rotationally advanced into large screw hole 108, the difference in the pitch of mating threaded portions 142,146 and the pitch of mating threaded portions 144,148 cause second frame portion 40 to move relative to first frame portion 36. This motion results in a change in frame angle 50, which can be expressed as the angle between bottom surface 150 of second frame portion 40 and top surface 152 of first frame portion 36. Rotation of second frame portion 40 relative to first frame portion 36 will cause large screw hole 108 and small screw hole 128 to become slightly misaligned. Differential screw 110 defines hex slot 154 in large diameter portion 146 for accepting a hex key, not shown. The hex key is used to rotationally advance differential screw 110 in hole 108.

In an embodiment of the present invention, frame 34 is machined from a single piece of aluminum. Changing frame angle 50 causes plastic distortion of thin portions 120,122 of flexures 42. Frame angle 50 is considered to be zero when surfaces 150,152 are parallel. When frame angle 50 is zero, flexures 42 are radially aligned with azimuth axis 28. To permit an effective range of angles for frame angle 50 in either direction, frame 34 is machined with second frame portion 40 rotated one degree relative to first frame portion 36. Differential screw 110 provides for adjusting frame angle 50 within ±0.5 degrees from the nominal operating point with 9.2 arc-minute per revolution of differential screw 110.

Referring now to FIG. 5, a drawing illustrating an alternative flexure embodiment is shown. In FIG. 5, simplified portions of first frame portion 36 and second frame portion 40 are shown joined by four flexures 42. Each flexure 42 includes thin plate 160 made from an elastically deformable material such as stainless steel. Thin plate 160 is attached to frame portions 36,40 using fastening screws 162 passing through fastening plates 164.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A frame for setting an azimuth angle of a tape head relative to magnetic tape passing by the tape head, the azimuth angle defined as the rotation of the tape head about an azimuth axis relative to a fixed base, the tape head held in a carriage for moving the tape head across the tape width, the frame comprising:

a first portion rigidly attached to the base;

a second portion holding the carriage, the second portion rotated a frame angle relative to the first portion, the frame angle measured about an axis parallel to the azimuth angle;

a plurality of flexures, each flexure connected on a first end to the first portion and connected on a second end opposite of the first end to the second portion, each flexure positioned such that, when the frame angle is at a preset value, the first end and the second end are radially aligned with the azimuth axis; and a drive set between the first portion and the second portion, the drive operative to rotate the second portion relative to the first portion by deflecting the plurality of flexures, thereby changing the azimuth angle.

2. A frame as in claim 1 wherein the first portion defines a first threaded hole and the second portion defines a second threaded hole, the first threaded hole and the second threaded hole having a substantially common centerline tangent to a circle centered on the azimuth axis, the drive comprising a differential screw threaded into the first threaded hole and the second threaded hole.

3. A frame as in claim 1 wherein each flexure comprises:

a first thin portion connected to the first frame portion;

a second thin portion connected to the second frame portion; and a thick portion connecting the first thin portion and the second thin portion.

4. A frame as in claim 3 wherein each flexure is constructed of a plastically deformable material, at least one thin portion of each flexure being deformed as the second portion rotates relative to the first portion.

5. A frame as in claim 1 wherein each flexure comprises a thin plate.

6. A frame as in claim 1 wherein the plurality of flexures is four flexures.

7. An azimuth adjustment system for changing the azimuth of a tape head relative to magnetic tape traveling in a tape path over the tape head, the azimuth defined as rotation about an azimuth axis through the tape path, the system comprising:

a carriage operative to hold the tape head;

a base stationary in relation to the tape path;

a frame having a first portion and a second portion connected to the first portion by a plurality of flexures, the first frame portion rigidly attached to the base, the second frame portion holding the carriage, the second portion rotated a frame angle relative to the first portion, the frame angle measured about an axis parallel to the azimuth angle, each flexure aligned radially about the azimuth axis when the frame angle is at a preset value, the plurality of flexures operative to permit rotation of the second frame portion relative to the first frame portion; and a drive set between the first frame portion and the second frame portion, the drive operative to rotate the second frame portion relative to the first frame portion, thereby changing the azimuth angle.

8. An azimuth adjustment system as in claim 7 wherein the first frame portion defines a first threaded hole and the second frame portion defines a second threaded hole, the first threaded hole and the second threaded hole having a substantially common centerline tangent to a circle centered on the azimuth axis, the drive comprising a differential screw threaded into the first threaded hole and the second threaded hole.

9. An azimuth adjustment system as in claim 7 wherein each flexure comprises:

a first thin portion connected to the first frame portion;

a second thin portion connected to the second frame portion; and a thick portion connecting the first thin portion and the second thin portion.

10. An azimuth adjustment system as in claim 9 wherein each flexure is constructed of a plastically deformable material, at least one thin portion of each flexure being deformed as the second frame portion rotates relative to the first frame portion.

11. An azimuth adjustment system as in claim 7 wherein each flexure comprises a thin plate having a first end fixed to the first frame portion and a second end fixed to the second frame portion.

12. An azimuth adjustment system as in claim 7 wherein the plurality of flexures is four flexures.

13. An azimuth adjustment system as in claim 7 wherein the second frame portion is operative to permit the carriage to move across the tape width.

* * * * *